Patented May 20, 1930

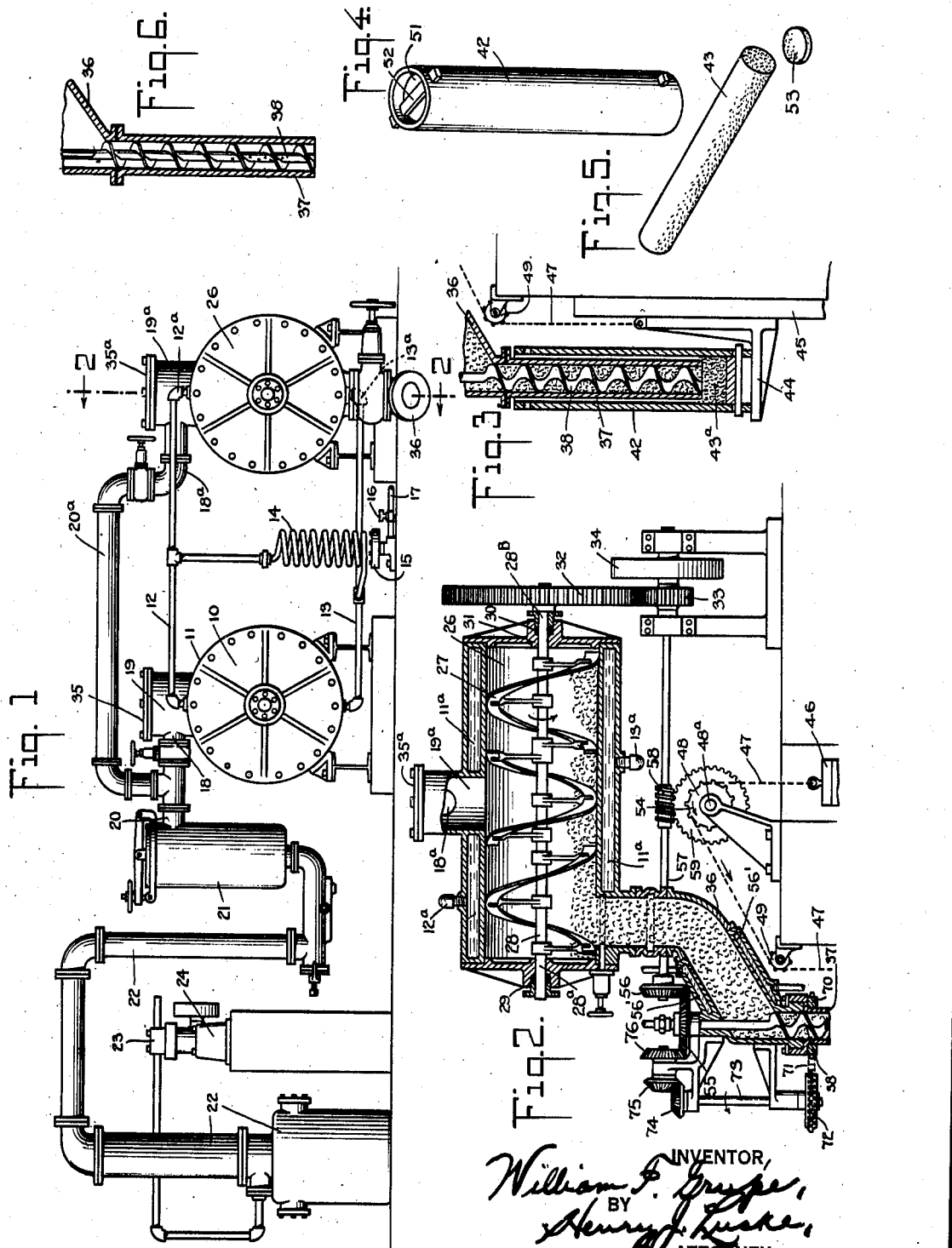

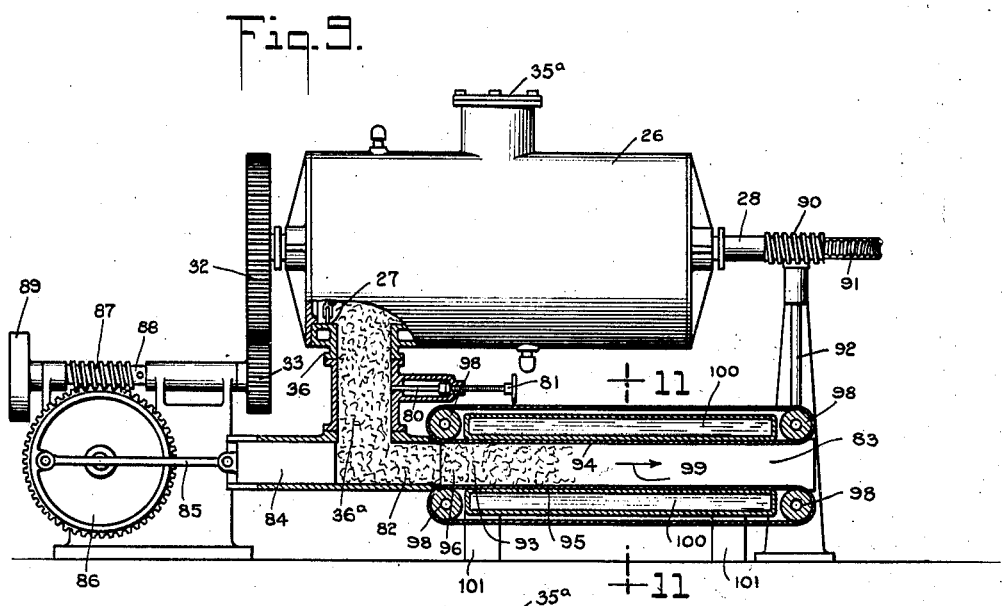
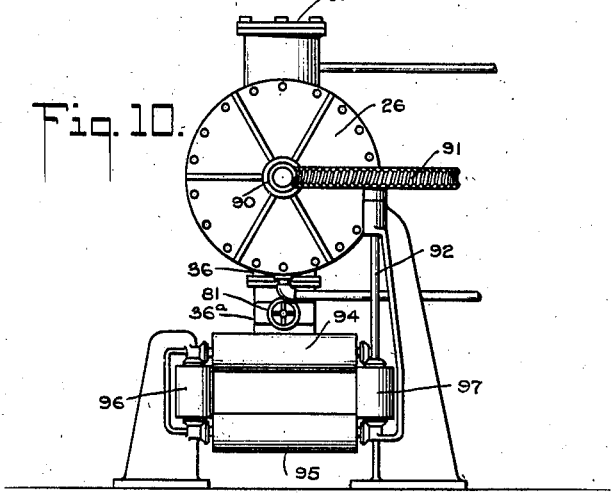
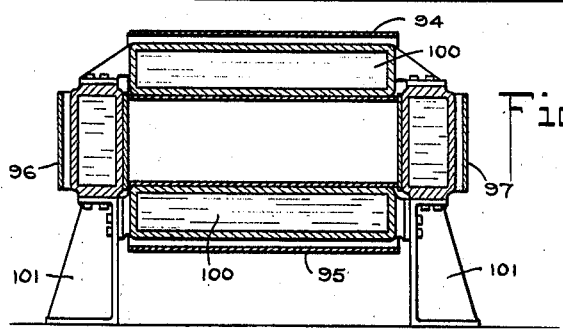

1,758,946

UNITED STATES PATENT OFFICE

WILLIAM F. GRUPE, OF RUTHERFORD, NEW JERSEY, ASSIGNOR TO ARMSTRONG CORK COMPANY, OF LANCASTER, PENNSYLVANIA, A CORPORATION OF PENNSYLVANIA

METHOD OF FORMING PRODUCTS FROM CORK AND THE RESULTING PRODUCT THEREOF

Application filed March 25, 1927. Serial No. 178,336.

This invention relates to an improved method of forming products from cork, and the resulting product thereof.

A preferred procedure embodying my process attains my cork product in substantially final state in respect to the individual cork particles and the adhesive or other bonding medium employed, including the characteristic of the cork product and the adhesive assuming their final dimensions respectively, thereby precluding further shrinkage or other distortion or other dimensional change.

Pursuant to my present invention, cork granules or other form of particles may be treated to render the resulting product free from fungus or other condition of decomposition or putrefaction.

By my process, further, the resulting product may be subjected to chemicals or other medium to free the same from darkening or other stains or to render the product to a "bleached" or uniformly whitened state. Such bleaching treatment is preferably made prior to the stage of removal of the water content.

It is advantageous to remove any water extraneous of the individual cork particles by the use of steam. Steam may also be employed to increase the total of water content of a given quantity of cork particles, in such instances where the water content inherent in the cork particles is below the average.

Such steam treatment is applied preferably in advance of the vacuum treating stage.

Further features and objects of my invention will be more fully understood from the following detail description and the accompanying drawings, in which—

Fig. 1 is a diagrammatic view in central sectional view of a type of apparatus for carrying out certain steps of my process;

Fig. 2 is a detail section view through line 2—2 of Fig. 1, showing the vacuum drum provided with its heating means and stirring means, and also the upper portion of the extruding means, the last named being disposed in the outlet of the vacuum drum;

Fig. 3 is a central vertical sectional view, showing the continuation and lower portion of the extruding means, supplemental to Fig. 2;

Fig. 4 is a perspective view of a mold filled under compression with cork mass extruded from the vacuum tank;

Fig. 5 is a perspective view of the resulting molded rod or cylinder or cork mass and a section of the same severed therefrom;

Figs. 7 and 8 are end and side elevations showing a further modification; and

Figs. 9, 10 and 11 illustrate a preferred form of combined compressing and molding unit;

Fig. 9 shows the same in vertical sectional elevation;

Fig. 10 in end elevation; and

Figure 6:
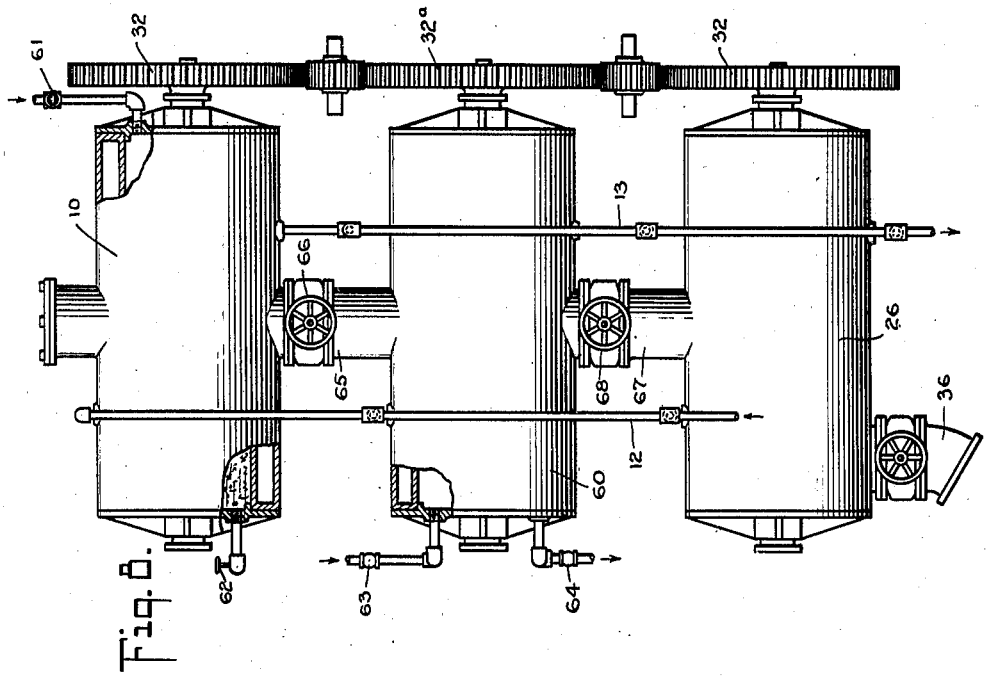
Fig. 6 is a view similar to a portion of Fig. 3, and showing a modification of my invention.

Fig. 11 on section line 11—11 of Fig. 10.

Pursuant to a preferred form of my invention, cork granules or other form of particles are charged into a drum 10 and subjected to a vacuum to thereby remove the whole or a substantial portion of the moisture from the cork particles. Such dehydrating step is facilitated by heating the cork particles, as by means of the heating jacket 11 connected by an inlet pipe 12 and an outlet pipe 13 with any suitably heated coil 14, disposed within the heating region of the flame of a burner 15, which is regulated in intensity by suitable thermostat means (not shown) controlling a cock 16 of a gas supply pipe 17.

Such heating stage is reduced in time period by subjecting the cork granules to agitation within the de-hydrating drum 10, as by means of a stirrer, preferably of a spiral formation, and rotated by suitable means, referred to more particularly hereinafter.

The removal of the water content of the cork particles is effected by any suitable means, as by a pipe 18 communicating at one end 19 with the interior of the drum 10 and at its other end 20 with the screen 21 of any approved form of condenser 22 suitable for the purpose, and including a vacuum pump 23, of any approved form.

The cork particles by such de-hydrating step are reduced to a substantially uniform content of water.

Usually, the inherent water content of cork particles, that is to say, the water lodged within the cellular structure of the individual cork particles, varies for any given quantity, arising from natural causes, and it is desirable to have the total content of water for successive quantities of cork particles substantially uniform. As one procedure for attaining such result, it is advantageous to treat each successive quantity fed into the drum 10 with steam prior to the vacuum treatment.

Such steam treatment facilitates the subsequent vacuum treatment in such cases where the inherent water content is above any desired average by the heat supplied by the steam expanding the inherent water content of the individual particles and releasing a portion of such inherent water content.

In such cases where the inherent water content is below the desired average, the steam supplied under proper control serves to add water to the given quantity of cork particles.

For the supply of steam to the drum 10, I employed any suitable piping leading to the interior of the drum, as is set forth more fully hereinafter.

The cork particles are now treated with the desired mixture of adhesive and any suitable "softening" agent as appears more fully hereinafter, under such conditions to agitation. For this purpose, the cork particles are charged into another drum 26, wherein the same are again heated, stirred and subjected to a vacuum, to thereby positively distribute the adhesive over the surfaces of the cork particles, remove any water or other vaporizable constituent of the adhesive and further de-hydrate the cork particles as may be desired.

Preferably, the second treating drum (shown in Fig. 1 for convenience of drawing at one side of the first treating drum 10) 26 is disposed below the first treating drum 10, to facilitate the discharge by gravity from the drum 10 into the lower drum 26, and thereby eliminating manual or other handling of the cork particles and, avoiding the exposure of the cork particles to the atmospheric air, and accordingly maintaining the condition of the particles and the water and other content of the same while in transit from the drum 10 into the drum 26.

The heating arrangement, the stirring mechanism and the vacuum attachment for the second treating drum 26, are designated by reference characters with the suffix "a" corresponding to the aforesaid corresponding parts of the same of the first heating drum 10. In particular, see Figs. 1 and 2, the drum 26 is provided with the stirrer 27, mounted within the drum 26 on the shaft 28, having its one end $28^a$ journalled in the sealed bearing 29 and its other end $28^b$ passing through the stuffing box 30 and bearing 31 exteriorly of the drum 26. The gear 32 is secured to the exterior end $28^b$ of the shaft 28, and is actuated by any suitable means, such as the driving gear 33 fixed to a shaft of the pulley 34, to which a belt may be applied.

The heating means of the drum 26, similar to that of the drum 10, is illustrated in the form of a jacket $11^a$ for the circulation of a heating medium such as oil, the inlet pipe $12^a$ and outlet pipe $13^a$ of which are connected to the heated coil 14, disposed within the flame of a burner 15, or equivalent, as will be understood.

The vacuum means of the drum 26, similar to that of the drum 10, is illustrated as comprising the pipe $18^a$, whose one end $19^a$ communicates with the interior of the drum 26 and whose other end connects through the pipe $20^a$ with the screen 21 of the condenser 22.

The cork particles are charged into the drum 26 through the inlet afforded by the enlarged end $19^a$ of the vacuum attachment, which is sealed closed to the atmosphere by its bolted cover plate 35. The drum 10 is similarly provided with a cover plate 35 which is removed when the drum is being charged and bolted in sealing relation to the inlet 19 when closed.

The treatment of the cork particles within the first treating drum 10 may be varied as may be required or desired.

For "bleaching" the cork particles, a suitable bleaching reagent is employed, such as chlorine water, as described more fully hereinafter.

Preferably, a "softening" treatment is carried out preliminary to the final vacuum and heating and compression stage effected in the drum 26. Such "softening" treatment may be had by the use of glycerine or other suitable agent as appears more fully hereinafter. The effect of such glycerine treatment on the final cork product is to increase or control its flexibility.

The glue or other adhesive supplied to the prepared cork particles may be at the stage of the "softening" treatment or may succeed the "softening" treatment.

The treating drum 26 is further provided with suitable discharging means for regulating the rate and the pressure of discharge of the treated cork particles into suitable molds for shaping the resulting cork product as may be desired. As an example of a cork product, I cite rods of cork from which cushions for bottle crown caps or the like, or gaskets or like final products may be derived by severing, punching or other procedure known to the art.

As one form of such discharging means, I illustrate the discharge chute 36, leading— and preferably downwardly—to the casing 37 of the extruding screw 38, driven by any suitable means, such as a beveled wheel 56 fixed on the shaft 40 of the discharge screw 41 and driven by a gear, or equivalent means.

Such extruding means 37, 38 serves to discharge the treated cork particles from the treating drum 26 and also to compress the same into a cork mass at a predetermined pressure which is regulated by the speed of rotation of the discharging and pressure screw 38 relative to its casing 37. For pressures exceeding a critical pressure, the discharge casing 37 may be rotated relative to the screw 38, the casing 37 in such instance having an annular sprocket gear secured to its exterior which is rotated by a suitable driving chain. The connection of the discharge casing 37 with the bottom edge of the discharge chute 36 is sealed by a suitable gland joint.

The screw 38 may make a close sliding fit with the inner face of its casing 37, and for such purpose the material of the inner face of the casing 37 may be brass and that of the screw steel.

For rotating the discharge casing 37, I have illustrated the annular gear 70; see Fig. 2, suitably secured on its inner face to the outer periphery of the face 37 and driven by a chain 71, or equivalent, in turn driven by the sprocket gear 72 mounted at one end of the shaft 73, at the opposite end of which is secured the beveled gear 75, or equivalent, driven from the driving shaft 58, as by means of a beveled gear 76 meshing with the beveled gear 55 of the extruding screw 38. The discharge casing 37 may be rotated either direction relative to the direction of rotation of the discharging and compression screw 38, to obtain the desired compression and uniformity of discharged output.

The molds for maturing and shaping the heated discharged cork mass may be of suitable inner configuration applicable to character of resulting product desired, and the mold is arranged in suitable relation to the extruding means to receive and retain the product at the desired predetermined compression.

The discharge chute 36 is controlled in elevated temperature and preferably by heating means operated or controlled independently of the heating means for the drum 26. I have indicated a heating jacket 56' for the chute 36, which may be supplied with a suitable heating medium such as oil and circulated from a suitably heated coil (not shown) and independently of the heated coil 14.

As one example I illustrate the mold 42 of cylindrical inner configuration for deriving a rod or cylinder 43 of the compressed cork mass. To receive and retain the cork extruded by the screw 38 from its casing 37 under the desired compression, I mount the mold 42 on a movable platform 44 which is urged in a direction opposite to that of the discharge of the compressed cork mass and at a pressure corresponding to that of predetermined compression of the extruded cork mass. One form of pressure mounting means for the movable platform 44 is illustrated in the form of a vertical trackway or grooved bracket 45, suitably supported in vertical position and a weight 46, see Fig. 2, of regulated mass suspended from one end of a chain 47 passing over the sprocket wheels 48, 49, of such member as may be required, and the opposite end 50 of the chain 47 is connected to the platform 44.

In Fig. 3, the cork mass 43$^a$ is shown partly filling the mold 42 and as the discharge of the cork mass is continued by the extruding means, the mold 42 is thus forced downwardly until it is completely filled, whereupon the top of the mold is closed by its cap 51 and the contained cork materal compressed at the predetermined pressure by suitable means, such as the bar 52.

Usually, for cushions of crown caps, gaskets and the like, the compression corresponds to the reduction in volume of the cork mass from a volume of from one and a half to unity. For other products and certain forms of cushions for crown caps, gaskets and the like, the predetermined pressure may be increased.

The cork mass 43 is retained in the mold 42 under the predetermined pressure until the adhesive has matured to its final form. Preferably, the mold 42 and the contained cork mass 43 are baked in an oven to attain or facilitate the maturing process of the adhesive and of the cork mass. Such oven is preferably provided with suitable vacuum means for maintaining the interior of the oven under a desired vacuum condition. After such heat or baking treatment the cork mass while still retained in the mold 42 may be subjected to a cooling treatment.

The final cork product is derived from the molded cork mass 43, as is readily understood by the art. Thus, for cushions of crown caps, the rod 43 is molded of a diameter corresponding to that of the cushion, and the respective cushions severed therefrom by any suitable cutting tool. One cushion 53 is illustrated in Fig. 5. For gaskets, the molded mass 43 is of circular form of appropriate diameter or of other configuration, and the individual gaskets punched or otherwise derived therefrom.

For the purpose of reducing the period of the hardening or other maturing process of the adhesive, the mixture of cork and adhesive may be treated with formaldehyde, hexametatetraamine or the like, which may be supplied to the interior of the casing, as by means of the pipe 54, see Fig. 6, supplied at the desired pressure from a suitable supply tank of the chemical. If hexametatetraamine is employed, the same may be added in powdered form to the cork mass within the drum 26.

The action of the extruding screw 37 in discharging the mixture of treated cork particles and adhesive through the adhesive about the faces of the cork particles, whereby the desired distribution of the chemical is attained upon the cork mass being finally discharged into a mold 42.

Preferably, the actuation of the extruding screw 38 is effected commensurately with the movement of the mold 42 relative to the casing 37, for which purpose the shaft 48ª, see Fig. 2, of the sprocket wheel 48 is positively rotated in the direction, say of the arrow 54, and simultaneously and commensurately with the actuation of the driving gear 55 of the extruding screw 38, illustrated diagrammatically by means of the bevelled gear 56 meshing with the bevelled gear 55, driven by the shaft 57, which in turn is driven by any suitable rotating means, such as the pulley 34 of the stirrer rotating means, as aforesaid. The pulley 34 may be mounted on or connected to the shaft 57. On the shaft 57 may be fixed the worm 58, meshing with the worm gear 59, mounted on the shaft 48ª of the sprocket gear 48. Accordingly, upon rotation of the shaft 58, the gear 55 is driven through the intermediation of its driving gear 56 at a rate determined by the ratio of gearing between the worm 58, its worm gear 59 and the sprocket gear 48.

Upon filling a mold, another mold is brought into operative relation with the outlet of the extruding casing 37, and the platform 44 is raised to thereby elevate the replaced mold 42 to the initial position of charging the same, as aforesaid. Such movement of the platform 44, with the extruding screw 38 in quiescent position, may be attained by mounting the sprocket gear 48 by means of a ratchet or equivalent relative to its shaft 48ª, to thereby permit free rotation of the sprocket 48 relative to its shaft 48ª in the direction opposite to the arrow 54 and therewith the return movement of the chain 47 and the platform 44. In such instance, the weight 46 may be sufficient to effect such return movement by gravity.

Figure 7:
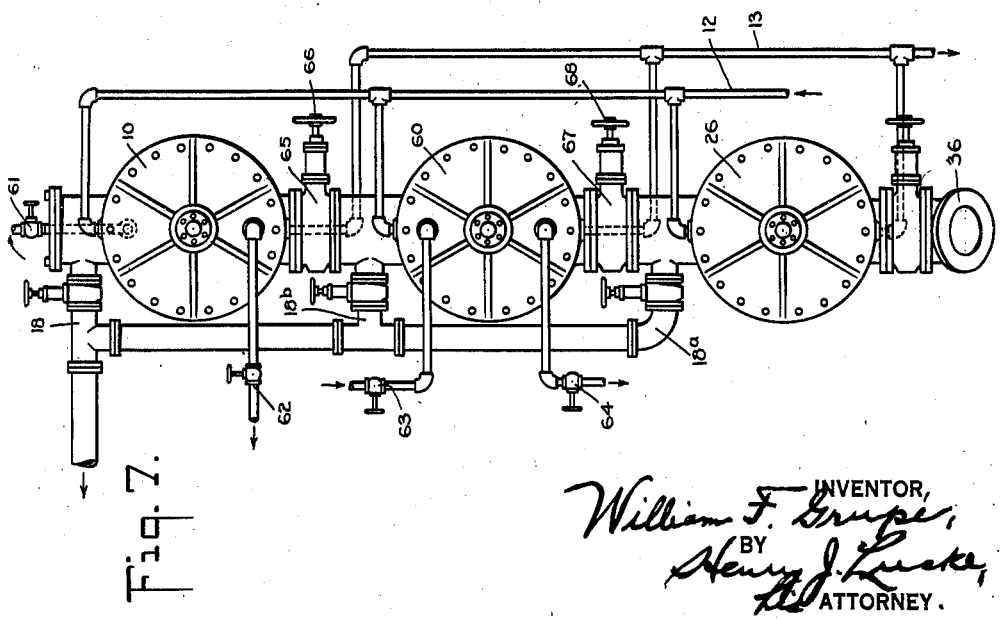

Preferably, my invention is carried out in a continuous procedure, as is indicated by the apparatus shown in Figs. 7 and 8. The uppermost drum 10 corresponds generally to the aforesaid first treating drum 10 appearing in Fig. 1, and such drum is provided with suitable heating means, with vacuum-applying means and a sealed charging opening, all of which parts are designated by like reference numbers as corresponding parts of the aforesaid drum 10. The drum 26 corresponds generally to the aforesaid second treating drum 26, illustrated in Figs. 1 and 2 hereinabove, and like parts are designated by like reference numbers. The drum 60, shown as disposed intermediate the aforesaid drum 10 and the aforesaid drum 26, is employed for carrying out certain treatment intermediate the treatment of the cork particles in drum 10 and that in drum 26. The three drums 10, 60, 26 are arranged to effect heating of either one, two or all three of the same as desired and similarly for effecting the vacuum conditions in any one, two or all three drums as desired. As appears more fully hereinafter, the drum 10 and the drum 60 are provided with water and other fluid supplying and draining means, the fluid inlet pipe for the drum 10 being indicated at 61 and its discharge pipe at 62, whereas the fluid inlet pipe for the drum 60 is indicated at 63 and its discharge pipe at 64.

The procedure indicated by my apparatus appearing in Figs. 7 and 8 is in principle similar to the hereinabove set forth procedure, to which is supplemented the following principal specific steps. The treating drum 10, after being filled to the desired extent with cork particles, is closed, and water or other suitable washing fluid is flowed into the tank 10 through the fluid inlet 61, whereupon the stirrer 27, see Fig. 2, of the drum 10 is rotated. The washing fluid is discharged through the fluid outlet pipe 62.

After the working stage, the cork particles are preferably treated in the drum 60 with steam, which may be supplied through the inlet 61. The steam treatment serves multifold purposes, including the evaporation of residual washing liquid and removed through the vacuum discharge 18ª, the withdrawl of water inherent in the cork particles, that is theretofore forming as a part of or lodged within the cellular structure of the individual cork particles and the control of final water content of any given quantity of cork particles treated successively in the drum 10, to thereby maintain substantially uniform water content of the final, successively formed cork products.

After such washing, the bleaching treatment may be had, as by a chlorine-water solution supplied through the fluid inlet 61 while the cork particles are under agitation by the stirrer 27. The surplus bleaching and disinfecting fluid may be drawn off through the fluid outlet 62. Any residual water and chlorine may be withdrawn through the vacuum pipe 18 and its condenser attachment 22, supplemented by heating, similarly as hereinabove set forth.

After completion of the treatment or treatments in the drum 10, the treated cork material is discharged through the discharge outlet 65 into the next lower drum 60, upon opening its movable valve member 66 and rotating the stirrer 27 of the drum 10.

The cork particles may now be treated in the drum 60 with glycerine, nulomoline or other softening material or medium, and with glue or other adhesive, preferably supplied successively in the order named through the inlet pipe 63. Such treatment of the cork particles is facilitated by a stirrer within the drum 60 similar to the aforesaid stirrer 27 of the aforesaid drum 10. The proportion of glycerine and of adhesive is controlled by the amounts of the same supplied and the proportion of the volatile constituent of the adhesive regulated by the temperature of heating, supplemented by vacuum condition controlled by the vacuum pipe $18^b$, similarly as hereinabove set forth relative to the aforesaid vacuum pipes 18, $18^a$ of the drum 10 and the drum 26, respectively.

After completion of the treatment in the drum 60, the treated cork particles are discharged into the final treating drum 26, for carrying out the processes therein, similarly as hereinabove set forth. The discharge from the drum 60 into the drum 26 is had through the discharge pipe 67 interconnecting the drum 60 with the drum 26, controlled by its movable valve member 68, and facilitated by the operation of a stirrer 27 within the drum 60.

By the continuous procedure indicated in Figs. 7 and 8, the cork particles are treated at the successive stages for the particular treatments desired and transferred from one drum to the next without manual handling and without exposing the cork material to atmospheric conditions, thereby obviating the effect of atmospheric influences and introducing variations of the treated condition of the cork particles and of the ingredients added.

The resulting product of my invention is reduced in whole or to as large an extent as desired of the original or inherent water content of the cork particles, and likewise of the vaporizable constituents of the adhesive and materials employed in treating the cork particles and the adhesive, whereby the mass resulting from the bonding of the compressed, adhesive-applied cork particles is initially attained in fully matured state, that is to say, of minimum dimensional mass of the cork particles and adhesive and obviating all ill effects due to chemical reaction resulting in decomposition and putrefaction arising in present day and prior methods of forming adhesively-bonded cork products.

From my observations, it is my belief that upon letting in air at the termination of the vacuum stage, particularly when the vacuum is "broken" suddenly, the glycerine or other softening material, glue or other binding material or other materials employed in the preceding or simultaneous treatments enter the interior of the masses of the individual particles. Such penetration of the substances may also be had by intermittently applying a vacuum and "breaking" the vacuum to such extents and for such time intervals as may be effectual in attaining the desired penetration.

By the use of chlorine or like agent, the cork particles are de-germinated and otherwise rendered sanitary. Such agent also renders the tone or color of the cork particles substantially uniform, and preferably of a substantially "white" color. When cork cushions for crown and other caps are formed pursuant to my invention, the tone or color of the cork is maintained notwithstanding contact with the bottle or other container contents such as beverages, foods, or the like.

Cork cushions and other forms of products made pursuant to my invention possess the advantageous property in being substantially inodorous.

In Figs. 9, 10, 11, I illustrate a preferred form of compressing and molding arrangement combined with the discharge of extruding outlet of a cork treating tank. Applying such arrangement to the final treating tank designated 26 of my above described apparatus, the extruding or discharge 36 is preferably provided with a shut-off gate valve 80, operated exteriorly by the screw 81 or equivalent, for controlling the discharge of the treated cork particles into the outlet compartment $36^a$ leading to the feeding compartment 82, in advance of the compression and molding unit 83. In the feeding compartment 82 I provide the plunger 84 or equivalent, reciprocated by the pitman 85, actuated by the cam gear 86, driven by the worm 87 on the shaft 88, in turn driven by the pulley 89 from a belt, or equivalent driving means. In such arrangement, the gear 33 may be advantageously mounted on the shaft 88 to be driven thereby, and thus drive the gear 32 of the stirrer 27, similarly as hereinabove described.

For the purpose of actuating the moving parts of my compressing and molding unit 83, the shaft 28 of the stirrer 27 may be extended through the opposite head of the treating tank 26, and suitable gearing or equivalent employed for driving connecting with the moving parts of my compressing and molding unit 83, as by means of the worm 90, mounted on the shaft 28 and meshing with the worm gear 91 mounted on the shaft 92.

My compressing and molding unit comprises generally an anterior compartment 93 for receiving the treated cork material discharged into the outlet compartment $36^a$ and fed upon the reciprocal movement of the plunger 84. Such anterior compartment 93 and remaining compartments of my compressing and molding unit 83 is formed of walls to which a predetermined movement is imparted, as by means of oppositely disposed sets of endless bands. Thus, the oppositely disposed bands 94, 95 constitute the upper and lower movable walls and the oppositely disposed bands 96, 97 constitute the movable opposite lateral walls, see Figs. 9, 10 and 11. Each of such endless bands is driven by a set of rollers 98, in turn rotated by suitable gearing driven from the main shaft 92, to positively move the respective bands at a predetermined rate of travel in the direction of the arrow 99, see Fig. 9, that is to say, in the outward and discharging direction of the molding unit 83.

Such endless band walls are held and guided by suitable positioning means, which preferably serve also as heating means for regulating the temperature within the molding unit 83. As one form of such combined guiding, positioning and temperature control means I illustrate the steam chests 100 fixedly mounted on the standards 101, which are preferably hollow to serve as inlet and outlet means for the steam or other medium serving as the temperature imparting and controlling agent.

It will be observed that in the operation of the form of my invention shown in Figs. 9, 10 and 11, the gate 80 is moved to closed position until sufficient quantity of the cork material has been accumulated within the discharge compartment 36 of the treating tank 26, whereupon the gate 80 is opened, to discharge the treated cork material into the feeding compartment 82, within the path of reciprocation of the plunger 84. The plunger 84 feeds the discharged treated cork material into the anterior compartment 93 of the molding unit 83, which at the initial stage of operation of the molding unit 83 is substantially closed on its exterior or discharge side by means of a previously formed cork block or by means of a wooden block of suitable contour or any other suitable filler, for the purpose of initiating the status of compression of the cork material advanced by the plunger 84 and to substantially exclude the atmospheric air from the interior of the molding unit.

Upon repeated reciprocation of the plunger 84 and consequent feeding of further accumulated treated cork material, the successively compressed increments are united homogeneously under compression within the anterior compartment 93 of my molding unit 83 and shaped by the oppositely disposed sets of bands 94, 95 and 96, 97.

The movement of the oppositely disposed band walls 94, 95 and 96, 97 imparts a gradual movement toward the discharge of the fully compressed cork mass, and also regulates the degree of compression as well as the configuration of the portion of the cork mass at the stage of compression. It will be observed that the edges of the bands 94, 96, 95, 97, engage their respective edges to substantially exclude the atmospheric air from contact with the cork material within the molding unit 83.

The steam chests 100, of equivalent heat controlling means, serve to regulate the temperature within the interior of the molding unit 83.

If it is desired to increase the degree of compression of the cork mass, the rate of linear travel of the inner leads of the wall bands 94, 95 and 96, 97 is decreased relative to the rate of reciprocation of the plunger 84, and conversely for decreased degree of compression.

It will be understood that the length of my molding unit is determined to meet the requirements of the particular products formed, and supplemental units in duplication of the illustrated molding unit 83, or equivalent, may be connected in sequence with one another, for attaining an extended range of temperature control, including if desired a stage of cooling whereby the final product is discharged from the molding unit at a suitable temperature in contact with the atmospheric air.

Whereas, I have described my invention by reference to specific forms thereof, it will be understood that many changes and modifications may be made without departing from the spirit of the invention.

I claim:

1. The method of forming cork products from cork particles which comprises subjecting the particles to steam and controlling the resultant moisture content of the particles under condition of sub-atmospheric pressure, then treating the particles with an adhesive under condition of sub-atmospheric pressure and then subjecting the particles to an elevated temperature under condition of sub-atmospheric pressure and compressing the resultant product under atmosphere pressure varying from sub-atmospheric pressure to atmospheric pressure.

2. The method of forming cork products from cork particles which comprises subjecting the particles to steam and controlling the resultant moisture content of the particles under condition of sub-atmospheric pressure, then treating the particles with an adhesive under condition of sub-atmospheric pressure and then subjecting the particles to an elevated temperature under condition of sub-atmospheric pressure and compressing the resultant product under atmosphere pressure varying gradually from sub-atmospheric pressure to atmospheric pressure.

3. The method of forming cork products from cork particles which comprises subjecting the particles to steam and controlling the resultant moisture content of the particles under condition of sub-atmospheric pressure, then treating the particles with an adhesive and simultaneously with a softening agent under condition of sub-atmospheric pressure and then subjecting the particles to an elevated temperature under condition of sub-atmospheric pressure and compressing the resultant product under atmosphere pressure varying from sub-atmospheric pressure to atmospheric pressure.

4. The method of forming cork products from cork particles which comprises subjecting the particles to steam and controlling the resultant moisture content of the particles under condition of sub-atmospheric pressure, then treating the particles with an adhesive under condition of sub-atmospheric pressure and then subjecting the particles to an elevated temperature and simultaneously with a hardening agent under condition of sub-atmospheric pressure and compressing the resultant product under atmosphere pressure varying from sub-atmospheric pressure to atmospheric pressure.

In testimony whereof I have signed this specification this 23rd day of February, 1927.

WILLIAM F. GRUPE.